INVENTOR
JACK AVINS

BY Eugene M. Whitacre
ATTORNEY

INVENTOR
JACK AVINS
BY Eugene M. Whitacre
ATTORNEY

INVENTOR
JACK AVINS
BY Eugene M. Whitacre
ATTORNEY

INVENTOR
JACK AVINS
BY Eugene M. Whitacre
ATTORNEY

INVENTOR
JACK AVINS

BY Eugene M. Whitacre
ATTORNEY

INVENTOR
JACK AVINS
BY Eugene M. Whitacre
ATTORNEY

United States Patent Office 3,399,353
Patented Aug. 27, 1968

3,399,353
FM COUNTER-TYPE DETECTOR ESPECIALLY SUITED FOR INTEGRATED CIRCUIT FABRICATION

Jack Avins, Princeton, N.J., assignor to Radio Corporation of America, a corporation of Delaware Continuation-in-part of application Ser. No. 370,232, May 26, 1964. This application June 2, 1967, Ser. No. 643,194
26 Claims. (Cl. 329—126)

ABSTRACT OF THE DISCLOSURE

A high performance frequency modulation detector system especially suited for fabrication using integrated circuit techniques includes an oscillator circuit having a free running frequency harmonically related to the center frequency of the input frequency modulated waves and a counter-type detector coupled thereto which generates constant area pulses at a repetition rate related to the frequency of the oscillator waves.

This is a continuation-in-part of application Ser. No. 370,232, filed May 26, 1964, now abandoned.

This invention relates to signal translating and demodulating systems for angle modulated carrier waves. The angle modulated carrier wave to be translated and demodulated may be but is not restricted to being the intercarrier beat between the picture and frequency modulated sound carrier in a television receiver. The term angle modulation refers to frequency modulation, phase modulation or a combination of frequency and phase modulation.

An object of the present invention is to provide an angle modulated carrier wave processing channel and angle modulation detector circuit for television, radio and communication receivers which can be fabricated using integrated circuit techniques, and which exhibits performance characteristics at least comparable to discrete component circuits presently used in angle modulation receivers.

Since inductors cannot be acceptably fabricated using integrated circuit techniques, primarily due to size limitations, it is desirable that the circuit to be integrated comprise essentially only resistors, capacitors and semiconductor devices such as rectifiers and transistors.

In accordance with the invention, an angle modulated wave from a suitable source is passed through a signal channel to an angle modulation detector. The angle modulation detector is of a type which develops a wave train including constant area pulses at a rate related to the frequency of the applied wave. Thus, when the frequency of the wave applied to the detector increases or decreases, the number of constant area pulses developed per second increases or decreases respectively. The wave train including the constant area pulses is then averaged to derive the original modulation information.

The signal channel for the angle modulated wave includes an oscillator circuit to which the FM wave is applied. In the absence of an applied wave, the oscillator circuit generates self-oscillations at a frequency which is harmonically related to the center or unmodulated frequency of the angle modulated carrier. When an angle modulated wave is present, the oscillator circuit locks in frequency and phase with the applied signal to provide a substantially constant amplitude output wave even in the presence of a considerable amount of amplitude modulation of the applied wave.

In accordance with one embodiment of the invention, the signal channel includes means for further limiting any residual amplitude modulation on the signal from the oscillator circuit. For reasons to be explained, the limiting means provides substantially constant rate-of-change of the wave voltage as it crosses the zero voltage axis, and in addition, maintains the zero voltage axis crossings of the limited wave in precise fixed phase relation with the zero voltage axis crossings of the wave from the oscillator circuit.

In accordance with another embodiment of the invention, the oscillator circuit function is provided by a plurality of amplifier stages connected in cascade, with a regenerative signal feedback path connecting the output of the last stage to the input of the first stage. As will become clear hereinafter, such an arrangement also provides limiting of any amplitude modulation on the oscillatory wave and, furthermore permits the sensitivity of the angle modulation detection to be greatly enhanced.

The angle modulation detector and oscillator circuits comprise essentially only resistive and capacitive elements, and semiconductor devices. It has been found desirable in some instances to use a resonant circuit including inductance and capacitance for controlling the frequency of operation of the oscillator circuit. In two embodiments of the invention, the resonant circuit serves the dual function of providing a frequency selective circuit for the carrier wave as well as the frequency determining circuit for the oscillator. As will be seen, this effects a savings of the resonant circuit usually used to tune the signal channel to the center frequency of the angle modulated carrier.

Under certain conditions the angle modulated wave may be interrupted. Examples of this occur in television receivers while tuning from one channel to another, or during conditions of noise which causes blocking of one or more stages preceding the sound takeoff point, or overmodulation in the negative (white) direction of the video carrier at which time the intercarrier beat is lost. Inter alia it is a function of the oscillator circuit to supply a wave at a frequency harmonically related to the center frequency of the angle modulated wave during such an interruption. Without the oscillator circuit, when the FM wave is interrupted the angle modulation detector does not produce pulses at the desired repetition rate. Under such a condition or any other condition where the constant area pulse repetition rate is changed by an amount exceeding the change in rate resulting from the maximum deviation of the carrier wave, a very large transient output is produced. In the case of sound receivers this output is evidenced by a disagreeably loud noise.

The oscillator circuit substantially eliminates or reduces to an acceptable low level the noise which would otherwise occur during the absence of the angle modulated carrier wave. When the angle modulated carrier wave is interrupted the oscillator circuit operates at substantially the center frequency of the carrier and the resultant change in repetition rate of the constant energy pulses between the carrier present and carrier absent conditions is relatively small. Hence, the angle modulation detector circuit produces very little noise output when the carrier is interrupted. In addition to the foregoing, the constant amplitude output signal from the oscillator circuit results in less stringent requirements than would otherwise be required of any succeeding stages which are provided for further limiting the wave applied to the angle modulation detector.

A system of the type described provides performance characteristics at least comparable to those of equivalent circuits used in commercially available frequency modulation receivers. The system is not critical and provides good performance for variations in component values corresponding to the tolerance variations normally expected in integrated circuit technology. The system requires no critical alignment or adjustment once put into a receiver.

Still further, the characteristics and values of the circuit components are entirely compatible with known integrated circuit techniques such as the monolithic silicon technology. As used herein, the terms, devices, elements, etc., are intended to be generic to the equivalent device, element, or the like incorporated in an integrated circuit.

The novel features which are considered to be characteristic of this invention are set forth with particularity in the appended claims. The invention itself however, both to its organization and method of operation as well as additional objects and advantages thereof will best be understood from the following description when read in connection with the accompanying drawings in which:

FIGURE 1 is a block diagram of an angle modulated carrier wave translating and demodulating system embodying the invention;

FIGURES 2*a*–2*g* are graphs showing electrical waveforms useful to explain the operation of the block diagram of FIGURE 1;

Figures 4, 7:
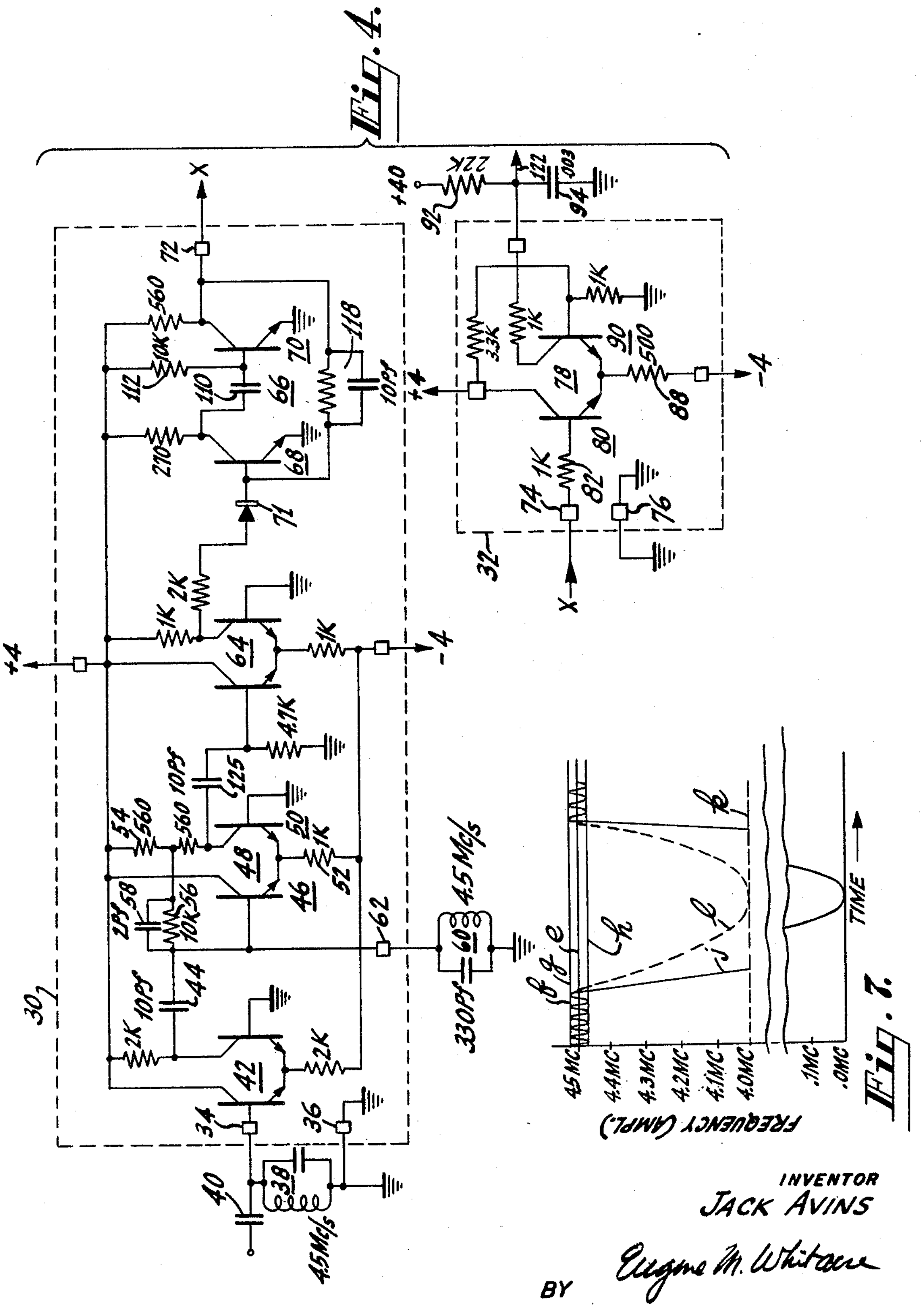
FIGURE 4 is a detailed schematic circuit diagram showing a specific circuit configuration of the FM wave translating and demodulating system of FIGURE 3.
Figure 8:
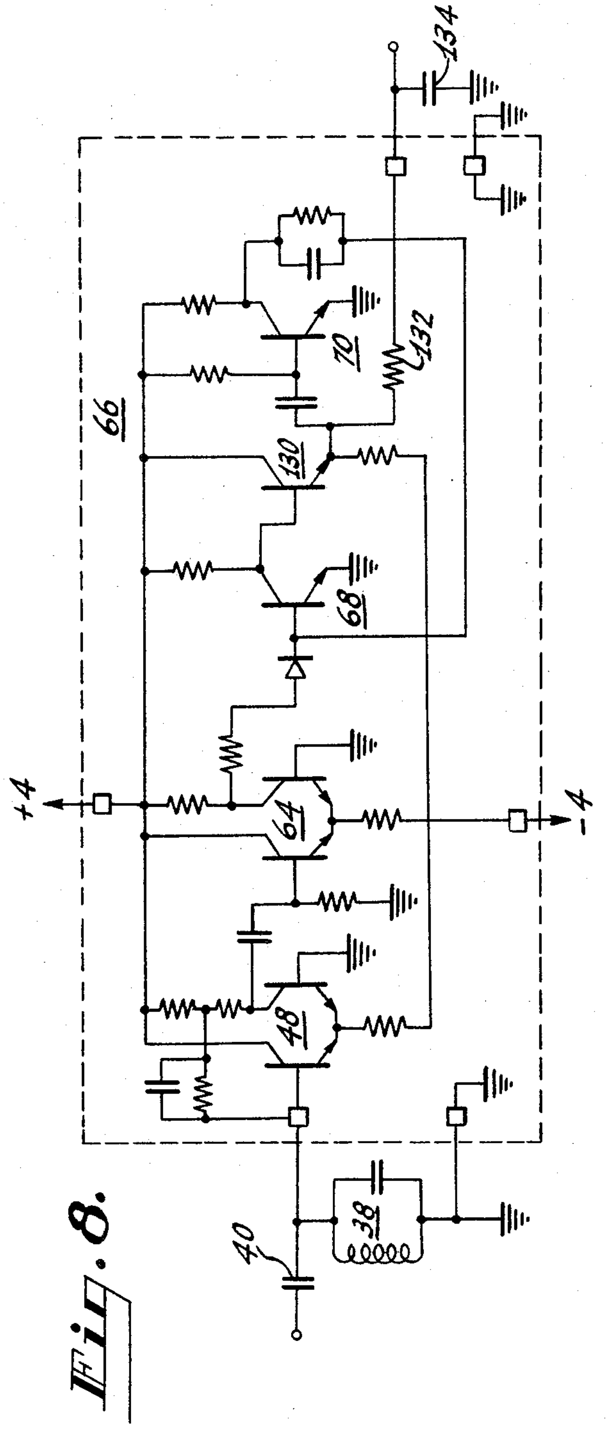
Figures 9, 10:
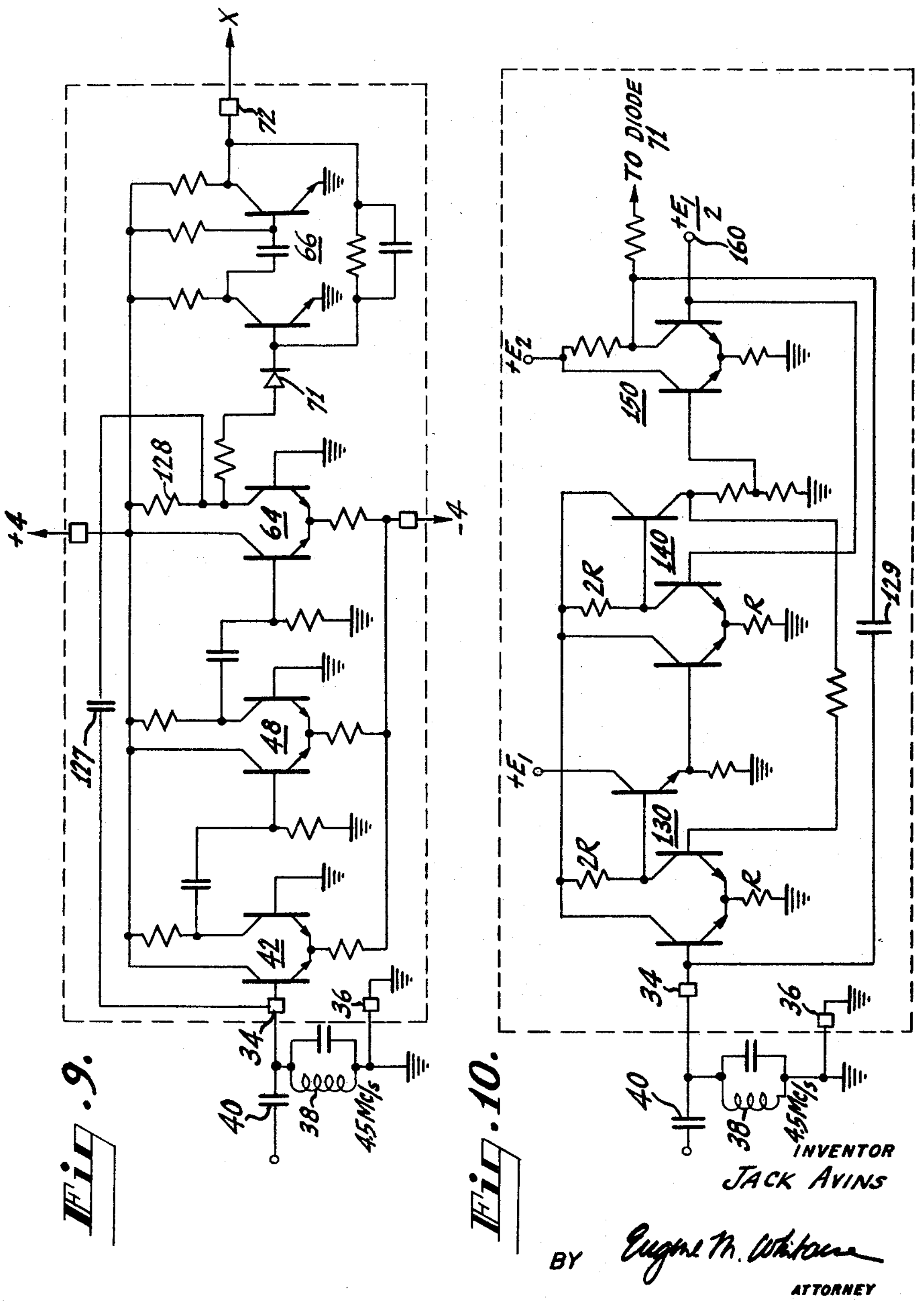

FIGURES 5*a*–5*k* are graphs showing electrical waveforms appearing in the circuit of FIGURE 4;

FIGURES 6*a*–6*f* are graphs showing wave form for (1) no signal, (2) weak signal, and (3) strong signal inputs for conditions when the oscillator stage operates normally and when the oscillator stage does not oscillate;

FIGURE 7 is a graph showing the amplitude of the output wave of the FM detector of FIGURE 4 as a function of time;

FIGURE 8 is a schematic circuit diagram of a modification of the circuit shown in FIGURE 4;

FIGURE 9 is a schematic circuit diagram of another modification of the circuit shown in FIGURE 4; and FIGURE 10 is a schematic circuit diagram of a modification of the circuit shown in FIGURE 9.

The various circuits shown in the drawings will be described in the context of a television receiver, in which case the source of angle modulated waves 10, of FIGURE 1 comprises a circuit for developing the 4.5 megacycles (mc./s.) intercarrier beat between the picture and sound carriers. It is to be understood, however, that the fundamental concepts to be described are more generally applicable. For example, the source of angle modulated waves 10 may comprise the intermediate frequency wave developed in superheterodyne receivers or a subcarrier wave of a multiplex system.

The FM waves from the source 10 are applied to an oscillator stage 12 which is locked in frequency and phase to the applied signal. During troughs or valleys caused by amplitude modulation of the applied wave, or in the absence of an applied wave from the source 10, the oscillator stage generates self-oscillations at a frequency which is harmonically related to the center frequency of the FM carrier wave. Preferably the oscillator circuit operates at the unmodulated FM carrier frequency or a submultiple thereof. In the case of television receivers, the oscillator operates at 4.5 megacycles or a submultiple thereof and has a free running frequency stability of the order of 0.5%.

The output wave from the oscillator stage 12 is of substantially constant amplitude over a wide range of input signal levels. This large signal level range is the result of a combination of factors including mistuning of the receiver, variable propagation and receiving conditions, misadjustment of the transmitter leading to overmodulation, and intermodulation of synchronizing and video information.

The wave from the oscillator circuit 12 is applied to an angle modulation detector 14 which includes a constant area pulse generator to provide a wave train including constant area output pulses at a repetition rate harmonically related to the frequency of the oscillator circuit wave. Preferably the generator produces pulses at a repetition rate corresponding to the frequency of the oscillator wave or a submultiple thereof. The wave train including the constant area pulses is integrated (averaged) to derive the original modulation information, which is fed to suitable utilization means 16. The utilization means 16 may comprise one or more amplifier stages driving a loudspeaker.

Although the oscillator frequency may be harmonically related to the unmodulated frequency of the applied angle modulated wave, and the pulse repetition rate of the constant area pulse generator may be harmonically related to the oscillator wave, it will be hereinafter assumed that the oscillator frequency and the pulse repetition rate bear a one-to-one relationship with the applied wave. With this assumption, one constant area pulse is produced for each cycle of the applied angle modulated wave.

FIGURE 2*a* represents the wave 18 applied from the oscillator circuit 12 to the angle modulation detector 14. For each zero voltage axis crossing of the wave 18 in one polarity direction (positive going) a constant area pulse is produced as indicated by the shaded pulses 19 of the wave train 20 shown in FIGURE 2*b*. The wave train 20 represents the conditions for an unmodulated carrier wave. As the carrier wave frequency increases, the constant area pulses 19 are closer together as shown in FIGURE 2*c*, and as the carrier frequency decreases the constant area pulses 19 are further apart as shown in FIGURE 2*d*.

The pulses 19 of FIGURES 2*b*–2*d* are of fixed duration or length, but the spacing between the pulses 19 varies with the instantaneous carrier frequency. The original modulating information can be recovered by integrating the constant area pulses 19 or by inverting the wave train 20 and integrating the variable area pulses 21 of FIGURES 2*e*–2*g* which are separated by a fixed duration 25. The graph of FIGURE 2*e* shows a wave train 23 which is 180° out-of-phase with that of FIGURE 2*b*. In like manner the wave trains shown in FIGURES 2*c* and 2*d* are 180° out-of-phase with those shown in FIGURES 2*f* and 2*g*. Accordingly, the signal recovered by integrating the wave train 20 is 180° out-of-phase with the signal recovered by integrating the wave trains 23.

The average voltage of the wave train 20 is $$\begin{aligned} e_{av} &= \frac{kT_0}{T}\hat{e} \\ &= kT_0\hat{e}f \\ &= k\hat{e}\frac{f}{f_0} \end{aligned} \quad (1)$$

where:

$T_0$=the period of the unmodulated wave $=\frac{1}{f_0}$ $T$=the period of the modulated wave$=\frac{1}{f}$ $\hat{e}$=the amplitude of the pulses 19

$k$=is a constant

The average voltage of the wave train 23 is $$\begin{aligned} e_{av} &= \frac{T-kT_0}{T}\hat{e} \\ &= \hat{e}-kT_0\hat{e}f \\ &= \hat{e}-k\hat{e}\frac{f}{f_0} \end{aligned} \quad (2)$$

The second term of Equation 2 is identical to Equation 1, and since $\hat{e}$ is a constant, the resultant modulation content of the two waves is the same, except reversed 180° in phase. The term constant area pulses or pulse generator as used herein refers to both the wave trains 20 and 23 or a generator of such wave train or an equivalent wave train. Thus the term constant area pulses applies to the portions 25 of the wave train 23 of FIGURES 2*e*–2*g*. The area of the portions 25 includes the area enclosed between the pulses 21 when a line is drawn between the peaks of the pulses 21.

Figure 1:
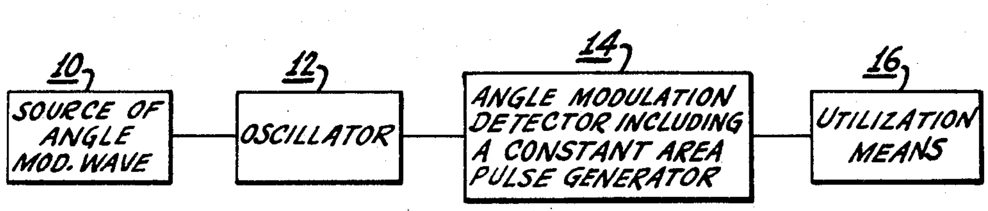

The various circuits shown in block form in FIGURE 1, are resistance-capacitance coupled so as to be compatible with integrated circuit technology.

Figure 3:
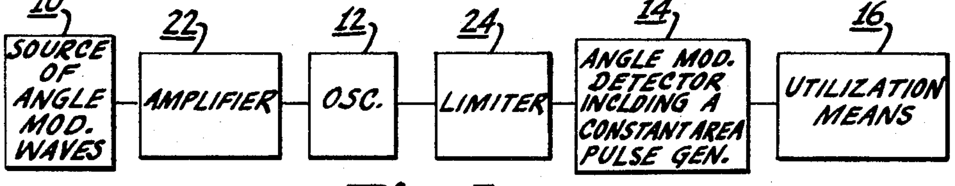
FIGURE 3 is a block diagram of an FM wave translating and demodulating system embodying the invention.

The block diagram of FIGURE 3 is similar to that of FIGURE 1 except that an amplifier 22 precedes the oscillator circuit 12, and the oscillator signal is limited in a stage 24 which precedes the angle modulation detector 14. The amplifier 22 improves the sensitivity of the circuit, and the limiter stage 24 improves the immunity of the circuit to amplitude modulation of the FM carrier.

The output wave from the stage 24 comprises essentially a square wave which is differentiated or used directly to trigger the constant area pulse generator of the detector 14. It is important that the slope of the leading edge of the triggering wave be maintained substantially constant so that the constant area of the pulses is maintained. Furthermore it is important that the leading edge of the triggering wave occur in substantially fixed phase relation to the zero voltage axis crossing of the oscillator wave for the same reason. Very small changes in the slope or phase of the triggering wave as a function of amplitude modulation of the applied FM wave may otherwise result in a significant undesirable output voltage from the constant area pulse generator. In this regard, the maximum amplitude modulating signal produces only about a +1.1 millimicrosecond change in the timing of the constant area pulses in television systems.

There are several types of circuits capable of providing limiting with the required phase and slope stability, and which incorporate essentially only resistors and capacitors desired for integrated circuits. Two examples of such circuits are emitter coupled limiters and Schmitt trigger circuits.

The schematic circuit diagram of FIGURE 4 shows one example of specific circuitry which may be included in the block diagram of FIGURE 3. The dashed rectangles 30 and 32 schematically illustrate two monolithic semiconductor integrated circuit chips. The chips have a plurality of contact areas about the periphery thereof through which connections to the integrated circuit of the chip may be made. For example, the chip 30 has a pair of input contact areas 34 and 36 for coupling to a source of FM waves. The contact area 36 provides a common, or ground, potential contact area which is connected with the various circuit ground connections shown on the chip.

If desired, the circuitry of the chips 30 and 32 may be formed as a single integrated circuit. As to physical dimensions, the chip 30 may be of the order of 100 mils x 100 mils, or smaller.

A resonant circuit 38, which corresponds to the source of angle modulated waves 10 of FIGURE 3, is tuned to the 4.5 mc./s. intercarrier beat of a television receiver. The circuit 38 is coupled through a capacitor 40 to the video amplifier or video detector portion of a television receiver, not shown.

The frequency modulated intercarrier beat wave developed across the resonant circuit 38 is applied through the contact areas 34 and 36 to the base electrode of the first transistor of an emitter coupled limiting amplifier 42. The amplifier 42, which corresponds to the amplifier 22 of FIGURE 3, comprises a known circuit design which will not be described in detail.

The frequency modulated wave from the collector electrode of the second transistor of the amplifier 42 is applied through a capacitor 44 to the base electrode of a transistor 46 which comprises a portion of an oscillator circuit 48. The oscillator circuit 48 includes a second grounded base transistor 50 which is coupled to the transistor 46 through a common emitter resistor 52. Oscillatory waves developed across a load resistor 54 for the transistor 50 are fed back through a parallel connected resistor 56 and capacitor 58 to the base electrode of the transistor 46. The frequency of oscillation is determined by a resonant circuit 60, external to the chip 30, which is connected to the base of the transistor 46 through a contact area 62.

The oscillator circuit shown and described provides stable Class A oscillation which is readily synchronized by an applied frequency modulated wave. The circuit configuration is advantageous in that the tuned circuit is so located that it simultaneously performs the functions of frequency selection as well as that of determining the oscillator frequency. The feedback from the collector of the transistor 50 to the base of the transistor 46 is phase compensated to avoid a reactive feedback component. This is desirable in order to avoid a change in resonant frequency of the circuit 60 as a function of input signal level. As noted above, the circuit must function over a very large range of input signal levels.

The oscillator stage output wave appearing at the collector electrode of the transistor 50 is applied to an emitter coupled limiter stage 64. Since the particular limiter circuit 64 is of known construction, a detailed description thereof is unnecessary.

The amplitude limited wave from the limiter 64 is applied to a constant area pulse generator 66 which in the present instance comprises a monostable multivibrator. The multivibrator includes a pair of transistors 68 and 70, and is so connected that in the stable state the transistor 70 is conducting and the transistor 68 is cutoff. A rectifier 71 is included in the coupling connection from the limiter 64 to pass the positive excursions of the applied wave. The leading edge of the positive wave excursions drives the transistor 68 from the nonconducting state to the conducting state, which in turn causes the transistor 70 to be cutoff. In practice the circuit is designed to remain in the unstable condition for about 75% of the period of the input wave before reverting to the stable state in time for the next positive triggering pulse.

The wave train from the generator 66 includes one constant area pulse for each cycle of the applied FM wave. These constant area pulses are available at the contact area 72, and are applied by connections, not shown but indicated by X—X, to the input contact areas 74 and 76 of the chip 32.

Amplification of the constant area pulses is effected in an emitter coupled amplifier 78 in a manner which reduces the requirement on the filtering of the voltage supply for the multivibrator. By operating the input transistor 80 between cutoff and saturation in response to the pulses from the generator 66 a "slicing" action is achieved which reduces the effects of amplitude changes of the pulses due to variations in power supply voltage.

A resistor 82 connected between the contact area 74 and the base electrode of the transistor 80 attenuates harmonics resulting from the switching action of the amplifier 78 and thus prevents undesirable interaction with preceding stages in the receiver.

A constant amplitude pulse developed across the emitter resistor 88 is applied to the second transistor 90 of the amplifier stage 78. The collector electrode of the transistor 90 is connected to a higher collector potential than used for the other transistors on the chip. As indicated in FIGURE 4, the load resistor 92 for the transistor 90, and the deemphasis capacitor 94 are not fabricated as an integrated portion of the chip. This has been done because the large resistance value of the resistor 92 and the large capacitance value of the capacitor 94 may require an inordinately large area on the chip at the present state of the art, and it is more economical to include these components as portions of higher signal level audio frequency circuitry.

Figure 5:
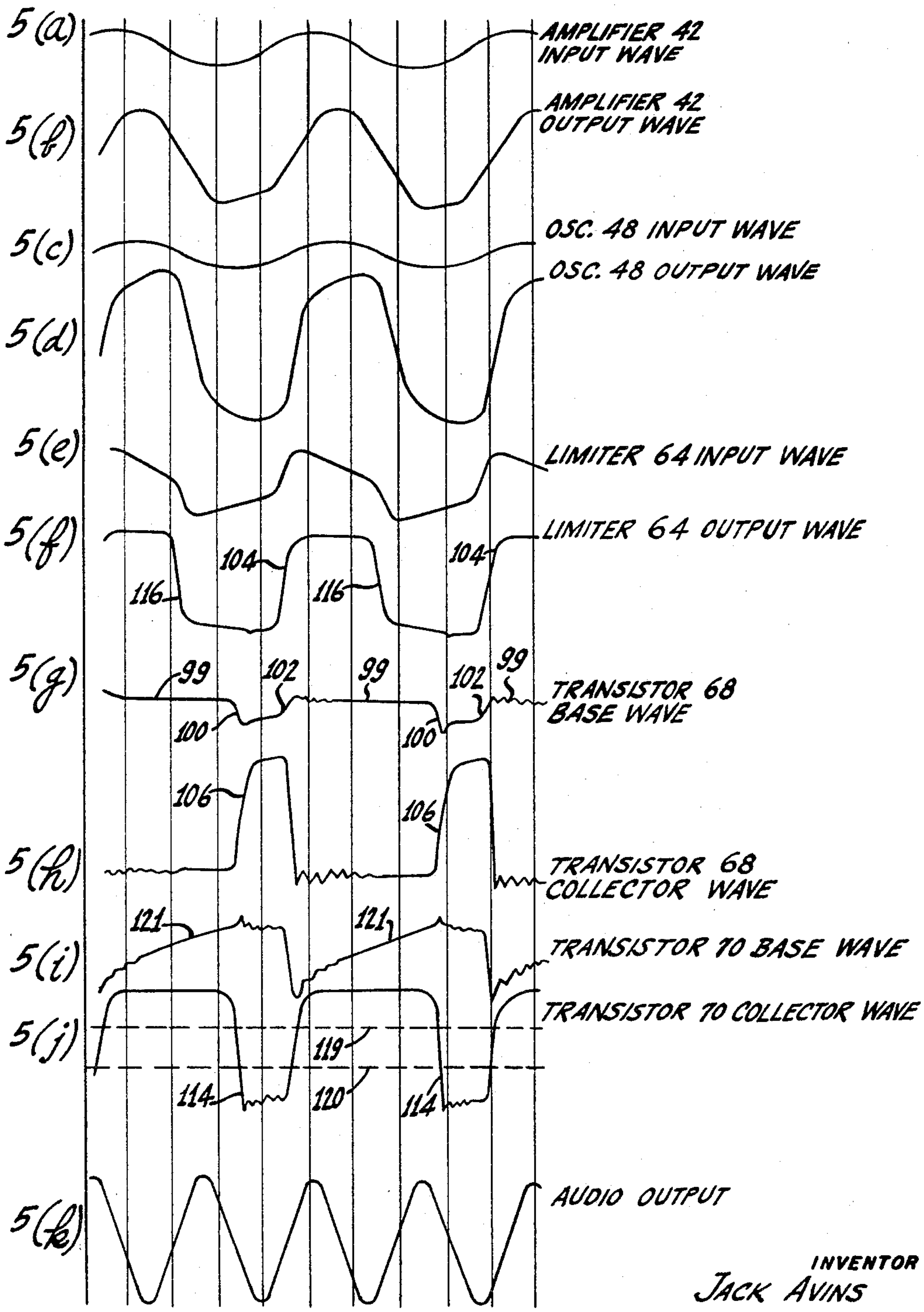

In describing the operation of the circuit of FIGURE 4 reference is made to the graphs of FIGURES 5*a*–5*k*. A 4.5 mc./s. FM wave to be demodulated is developed across the resonant circuit 38 and applied to the amplifier 42. The input wave is shown in FIGURE 5*a*. The abscissas of the various graphs of FIGURE 5 represent time and the ordinates represent voltage. The same time scale is used for all of the graphs of FIGURE 5, and the same voltage scale is used for the graphs of FIGURES 5*b*–5*j*. The voltage scale of FIGURE 5*a* is expanded 10 times as compared to those of FIGURES 5*b*–5*j*.

The amplified wave developed at the collector electrode of the second transistor of the amplifier stage 42 and shown in FIGURE 5*b*, is applied to the oscillator stage 48. The wave appearing at the base electrode of the transistor 46 of the oscillator stage 48 is somewhat reduced in amplitude as shown in FIGURE 5*c* due to the decoupling effect of the relatively small capacitor 44. An improvement in the Q of the resonant circuit 60 is achieved by the decoupling effect of the capacitor 44.

The oscillator output wave appearing at the collector of the transistor 50 is of substantially constant amplitude for a wide range of input levels and is shown in FIGURE 5*d*. As can be seen, the oscillator stage 48 provides essentially a symmetrical wave with limiting of the excursions in the positive and negative directions.

From the oscillator stage 48 the wave is applied to the limiter stage 64. As can be seen from FIGURE 5*e*, the wave from the oscillator stage 48 is somewhat reduced in amplitude by the relatively small coupling capacitor 125 between the oscillator stage 48 and limiter stage 64. At the output of the limiter stage 64 the wave is of substantially rectangular configuration and has relatively steep leading edges of substantially constant slope. The limiter stage 64 output wave which is shown in FIGURE 5*f* is applied to the constant area pulse generator 66.

The waveform at the base electrode of the transistor 68 is shown in FIGURE 5*g*. During the positive portions 99 of the wave the transistor 68 is conducting, and the negative going excursion 100 occurs when the multivibrator reverts to its stable state and the transistor 68 cutsoff. The positive going excursions 102 is due to the triggering action of the positive going portion 104 of the waveform shown in FIGURE 5*f* which causes the transistor 68 to become conductive.

The waveform at the collector electrode of the transistor 68 is shown in FIGURE 5*h*. The positive going pulses 106 indicate those times when the transistor 68 is cutoff.

The waveform at the base electrode of the transistor 70 is shown in FIGURE 5*i* where the gradually rising portion 121 indicates the charging of the capacitor 110 through the resistor 112 and the transistor 68. When the capacitor 110 is charged to a predetermined positive voltage, the transistor 70 is rendered conductive as indicated by the negative going pulses 114 shown in FIGURE 5*j*. The positive portion of the pulses of FIGURE 5*j* indicates that the transistor 70 is cutoff.

In summary, positive going pulses 104 from the limiter stage 64 drive the transistor 68 into conduction for a time determined by the time constant of the resistor 112 and capacitor 110. The transistor 68 is held in conduction, even during the negative excursion 116 (FIGURE 5*f*) by the regenerative action of the feedback network 118. The timing is such that the circuit reverts to its stable state with the transistor 70 conducting and the transistor 68 cutoff, through the feedback network 118, prior to the occurrence of the next positive going pulse 104 of the waveform of FIGURE 5*f*.

The pulses appearing at the collector electrode of the transistor 70 are applied to the amplifier 78 on the chip 32. The transistor 80 operates between cutoff and saturation to slice a portion, such as the portion between the dashed lines 119 and 120, out of the wave of FIGURE 5*j*. The quiescent bias for the transistor 80 is developed across the resistor 88 as a function of the maximum current through the transistor 90. By using a relatively high collector voltage for the transistor 90, relatively large amplitude current pulses are developed which are averaged by the capacitor 94 to produce an audio output voltage (FIGURE 5*k*) at the terminal 122. The terminal 122 is coupled to suitable utilization means such as a power output stage for driving a loudspeaker.

Figure 6:
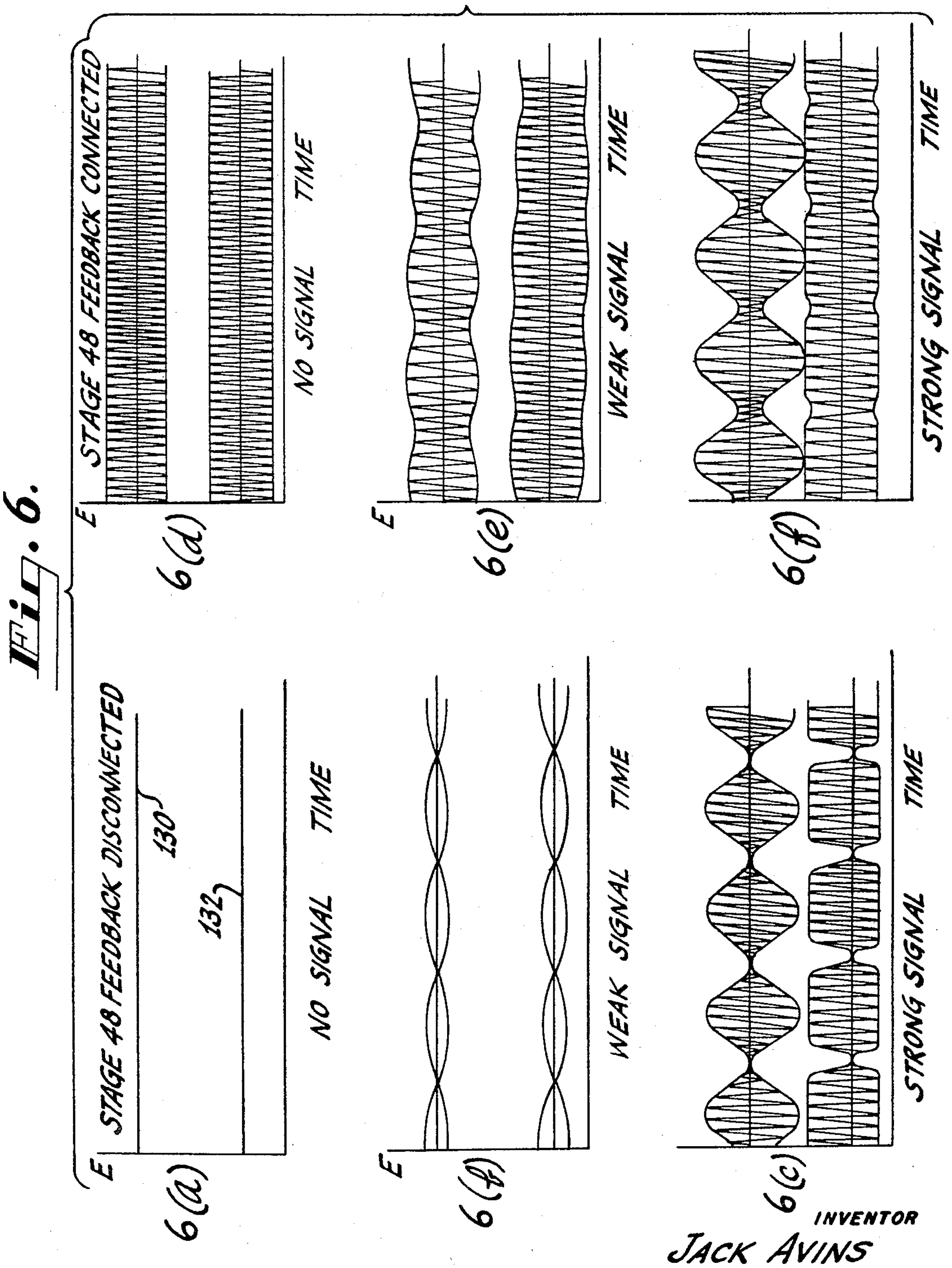

Some of the advantages derived as a result of the use of the oscillator stage 48 in translating the signal to the constant area pulse generator 66 will be better understood with reference to FIGURES 6*a*–6*f*. FIGURES 6*a*–6*c* are graphs representing the conditions of operation for different input signal levels when the feedback network including the resistor 56 and capacitor 58 of the oscillator circuit 48 shown in FIGURE 4 is disconnected so that the stage 48 operates as an amplifier-limiter. The graphs of FIGURES 6*d*–6*f* are the corresponding conditions of operation with the feedback network connected in circuit as shown in FIGURE 4 so that the stage 48 operates as an oscillator.

Each of FIGURES 6*a*–6*f* shown two graphs. The upper graph represents the input voltage waveform of the stage 48, and the lower graph represents the output voltage waveform of the stage 48. The voltage axes of the upper graphs are expanded relative to the voltage axes of the lower graphs.

First, consider the conditions when no signal is applied to the oscillator stage 48. With the feedback network disconnected the input and output circuit waveforms 130 and 132 of FIGURE 6*a* may be represented as a straight line since no signal is present. For the same signal conditions with the feedback network in circuit, the wave at the input and output circuits of the oscillator stage 48 are shown in upper and lower graphs respectively of FIGURE 6*d*.

The corresponding curves are shown in FIGURES 6*b* and 6*e* for weak signal operation, and the conditions when strong signals are applied to the stage 48 are shown in FIGURES 6*c* and 6*f*. With the stage 48 operating as an amplifier as shown in FIGURES 6*a*–6*c* not only is the output level (lower graph) a function of the input level (upper graph), but amplitude modulation of the input signal appears in the output signal. Furthermore when the input wave is amplitude modulated as shown in the upper graphs of FIGURES 6*b* and 6*c*, there are times when the output signal shown in the lower graphs disappears, resulting in the loss of a triggering wave for the constant area pulse generator 66.

When the stage 48 is connected as an oscillator as shown in FIGURE 4, the amplitude of the output signal is substantially constant over a wide range of signal input levels as shown in the lower graphs of FIGURES 6*d*–6*f*. In addition, even though the wave appearing at the oscillator input circuit is over 100% amplitude modulated, the wave appearing at the oscillator output circuit is of substantially constant amplitude. In the troughs of the amplitude modulated wave, where there is effectively no wave input, the oscillator stage 48 generates self-oscillations to fill-in the gap and provide a wave at substantially the center or unmodulated frequency of the FM carrier wave to ensure triggering of the constant area pulse generator 66 during these intervals.

With the stage 48 operating as an amplifier and producing an output wave as shown in FIGURES 6*a*, 6*b* or 6*c*, extremely large noise transients would result which would render the circuit unsatisfactory for commercial use. To understand the magnitude of some of the problems attendant in circuits of the type described, attention is directed to the graph of FIGURE 7. For the purposes of discussion, assume that the feedback network 56–58 is removed and that the stage 48 operates as an amplifier. With an unmodulated carrier wave applied, the average direct voltage output level from the constant area pulse generator 66 is of an amplitude related to the carrier frequency and is indicated by the reference line *e*. Now assume that the carrier wave is frequency modulated by a maximum amplitude 400 cycle signal. For television transmissions the 400 cycle signal produces a maximum frequency deviation of the carrier of ±25 kc./s. 400 times per second. A wave thus modulated causes a 400 cycle output signal *f* to be developed. The amplitude of the output signal is a function of the deviation of the FM carrier, and for maximum deviation the maximum peak-to-peak amplitude of the 400 cycle output signal is represented by the voltage difference between the lines *g* and *h*.

Assume now that the FM wave is interrupted, as may occur during channel changing operations. Under these conditions, the wave of FIGURES 5*a*–5*f* will be absent and the monostable multivibrator will not be triggered. This means that the multivibrator which had been producing constant area pulses at a rate of 4.5 megacycles, ±25 kc., suddenly ceases to produce pulses. In other words, so far as the detector is concerned, it is as if the FM carrier wave which is deviated ±25 kc. for maximum amplitude program signals were suddenly deviated 4.5 megacycles. The resultant output transient from the circuit is represented by the curve *j*, the largest part of which has been broken away. The resultant transient *j* causes an extremely loud and objectionable sound output to be produced. It will be understood that the same sort of sound output would be produced during interference or overmodulation conditions which prevent the sound beat carrier from reaching the sound take-off point.

The oscillator stage 48 prevents this type of operation by providing self-oscillations at the FM carrier frequency when the FM carrier is interrupted. Hence, the constant energy pulse generator 66 continues to produce pulses at a 4.5 mc. rate so that the output voltage from the system remains at a level represented by the line *e*.

It is desirable that the oscillator stage have a frequency stability of about 0.5% or in other words that the oscillator have a free running frequency which is within the limits of the maximum permissible carrier frequency deviation. If the oscillator stage does not operate with sufficient stability, and should drift by an amount such as 10% from the desired free running frequency, then interruption of the FM carrier will produce an objectionably loud transient response represented by the dashed curve *l* of FIGURE 7.

Figure 2:
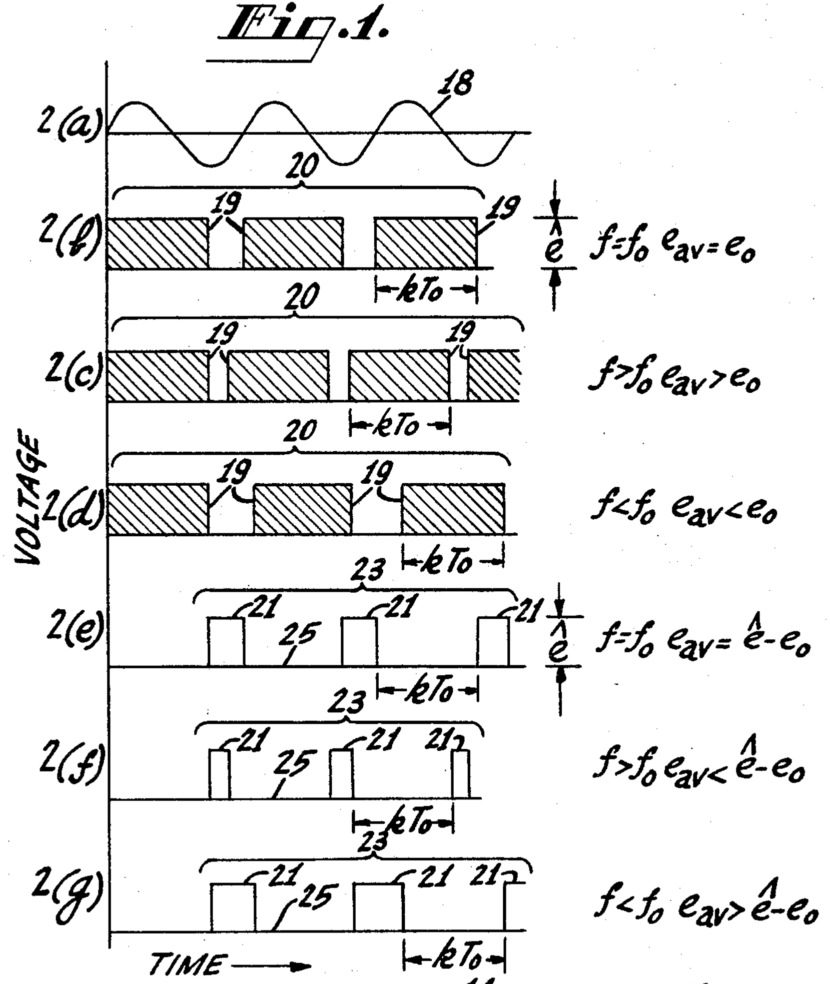

The problems with respect to the selection of an appropriate limiting circuitry will be understood by reference to FIGURE 2. Simple arithmetic shows that for a carrier of 4.5 megacycles each cycle is about 222 millimicroseconds long. For the maximum frequency deviation of 25 kilocycles, the desired modulating signal information can cause the timing of the cycle to be displaced a maximum of about ±1.1 millimicroseconds from a reference position. Accordingly, it can be seen that any change in the timing of the constant energy pulse generator as a function of amplitude modulation, produces a large effect in the demodulated signal.

In this regard the oscillator stage 48 provides a significant contribution in providing a substantially constant amplitude output signal for a wide range of input signal levels. Thus the stringency of the requirement on the number and design precision of the limiter stages following the oscillator stage is materially reduced.

The circuit of FIGURE 8 is similar to that of FIGURE 4 except that the amplifier 42 has been eliminated, and the monostable multivibrator of the pulse generator 66 has been modified. The resonant circuit 38 is connected directly to the oscillator circuit 48, and serves the dual function of signal selection and determining the free running frequency of the oscillator circuit. Otherwise the oscillator circuit 48 and limiter stage 64 are identical to the corresponding stages of FIGURE 4.

The constant area pulse generator 66 of FIGURE 8 has been modified to include an emitter follower stage 130 between the transistors 68 and 70. In the circuit of FIGURE 4 it was discovered that the pulse width tends to vary as a function of the frequency of the applied wave. This results in a degenerative type of action which tends to reduce the amplitude of the resultant audio frequency signal.

The reasons for the change in pulse width with frequency can be explained with reference to the graph of FIGURE 5*h*. The top of the positive pulse 106, which represents the collector voltage of the transistor 68, has a slight slope. This voltage determines the charge on the capacitor 110 during the time the transistor 68 is cutoff. If the time at which the multivibrator is triggered is increased or decreased, the width of the positive pulse 106 changes and produces a corresponding incremental change in the charge on the capacitor 110. This in turn changes the charge time of the resistance-capacitance network 110-112 which controls the time when the transistor 70 becomes conductive.

In the circuit of FIGURE 8 the slight changes in the charge of the capacitor 110 are minimized by the emitter-follower circuit 130 which provides a lower impedance charging path for the capacitor 110. Accordingly, the degenerative action is reduced and the audio frequency output voltage is increased.

In the circuit of FIGURE 8 the audio frequency output voltage is derived from the emitter-follower stage 130 through a resistor 132 and an integrating capacitor 134. The wave which is integrated corresponds to that shown in FIGURES 2*e*–2*g* and comprises variable area pulses separated by a fixed amount of time. Stated conversely, the wave which is integrated is phase reversed from the wave appearing at the collector of the transistor 70.

The circuit of FIGURE 9 is similar to that of FIGURE 4 except that the stages 42, 48 and 64 cooperate to provide the oscillator function normally provided by the stage 48 in FIGURE 4. To this end, the network 56–58 is removed so that the stage 48 operates as an amplifier; and a regenerative feedback connection providing sufficient gain is included, on the integrated circuit chip for example, to couple the collector electrode of the second transistor in the stage 64 to the base electrode of the first transistor in the stage 42 so as to produce the oscillations. The frequency of the oscillations developed across the load resistor 128 in the stage 64 is determined by the resonant circuit 38, which is connected directly to the stage 42. As in the arrangement of FIGURE 8, the resonant circuit 38 serves the additional function of signal frequency selection.

The feedback connection from the stage 64 to the stage 42 may include a capacitor 127, whose value is typically of the order of less than 1 picofarad. This value is such as to provide sufficient signal feedback to sustain the oscillations in the stage 64. The oscillatory wave appears at the collector electrode of the second transistor in the stage 64 and is of substantially constant amplitude for wide variations in input signal level. The positive and negative excursions of the wave are symmetrically limited by the stage 64.

By taking the signal feedback from the output of the stage 64 to the input of the stage 42 in FIGURE 9, the sensitivity of the circuit shown is greatly enhanced. More particularly, with the signal gain provided by the stage 48 added to that of the amplifier stage 42, it has been observed that the steady state value of the limited oscillator output wave is reached when the voltage at the input to the circuit is within the microvolt range. This, therefore, enables the arrangement of FIGURE 9 to lock-in on input signals within a range many times less than exists in the more usual circuit arrangements where injection voltages of the order of tens of millivolts are often required. It should also be noted that the circuit arrangement of FIGURE 9, like that of FIGURE 8, effects a savings not only of a tuned resonant circuit, but of a terminal on the integrated chip as well. This represents a significant feature of the present invention when used in an environment where the number of terminals available for external connections is limited.

The circuit of FIGURE 10 also includes a one picofarad or so capacitor 129 in the regenerative feedback path from the output of the last cascade connected amplifier stage to the input of the first such stage. The arrangement is similar to that of FIGURE 9 in that the feedback connection and overall gain greatly improves the circuit sensitivity. It differs from that of FIGURE 9, however, in that the individual amplifier stages 130, 140 and 150 are direct current conductively coupled, and are of a form described and claimed in my pending application Ser. No. 396,140, filed Sept. 14, 1964 and entitled Signal Translating System, now Patent No. 3,366,889. More particularly: the stages 130 and 140 each comprise an emitter coupled amplifier driving an emitter follower circuit; the two-to-one resistor ratios shown facilitate the direct current coupling in the presence of temperature and/or power supply variations; the stage 150 comprises an emitter coupled amplifier and may be operated at a higher power level than either of the stages 130 or 140; a source of bias potential 160 equal to one-half the operating potential of the stages 130 and 140 is employed; and the direct current feedback connections maintain the base electrodes of the emitter coupled amplifier transistors at substantially that same potential. As described in the Ser. No. 396,140 application, this amplifier arrangement can be easily constructed using present day integrated circuit fabrication techniques.

As can be seen by reference to FIGURES 4, 8 and 9 all of the elements, with the exception of the resonant circuits 38 and 60 can be formed using presently available integrated circuit techniques. That is to say, the resistors and capacitors used in the various circuits are of values which be reproducibly obtained using presently available integrated circuit technology. By way of example, known monolithic integrated circuit techniques may be used wherein a combination of diffusion and evaporation processes are used to form planar transistors, resistors and capacitors on a semiconductor body.

Although the circuits described in FIGURES 4, 8 and 9 may appear to include a relatively large number of circuit elements as compared to corresponding circuits in existing television receivers, it should be understood that many of the elements may be formed at the same time with common processing steps during the forming of the integrated circuit. In the present situation, the apparent complexity does not correspondingly increase the cost. The problem is more in the nature of providing a circuit which can be fabricated using integrated circuit techniques and at the same time providing operating characteristics which are at least comparable with existing circuits.

It should also be understood that while the present invention has been particularly described in the context of an angle modulated detector of the type which includes a constant area pulse generator, other types of such detector circuits may also be employed without detracting from its teachings. Thus, with a slope detector or frequency discriminator circuit employing, for example, the type of feedback described in connection with the arrangement of FIGURE 9, it will be found that the use of the locked oscillator approach herein described also improves the impulse noise immunity and AM rejection provided by the more conventional locked oscillator systems.

What is claimed is:

1. A signal translating system for angle modulated carrier waves comprising:

sinusoidal oscillator circuit means for providing free-running oscillations at a frequency harmonically related to the center frequency of said carrier waves;

means for applying said angle modulated carrier waves to said oscillator circuit means; and circuit means coupled to said oscillator circuit means for developing pulses in response to said free-running oscillations at a repetition rate related to the frequency of the waves from said oscillator circuit.

2. A signal translating system for angle modulated carrier waves comprising:

sinusoidal oscillator circuit means for providing free-running oscillations at a frequency harmonically related to the center frequency of said carrier waves;

means for applying said angle modulated carrier waves to said oscillator circuit means;

means including a monostable multivibrator coupled to said oscillator circuit means for developing a wave train including constant area pulses at a repetition rate harmonically related to the frequency of the waves from said oscillator circuit means; and means coupled to said developing means for averaging said wave train to derive the modulating signal components of said angle modulated carrier wave.

3. A signal translating system for angle modulated carrier waves comprising:

means providing a sinusoidal oscillator having a signal feedback network and including a frequency determining resonant circuit coupled thereto which is tuned to a frequency harmonically related to the center frequency of said carrier waves;

means for applying angle modulated carrier waves to said resonant circuit whereby said resonant circuit additionally functions to provide carrier wave frequency selection; and circuit means coupled to said oscillator for developing a wave including equal area pulses at a repetition rate related to the frequency of the waves from said oscillator circuit.

4. A signal translating system for angle modulated carrier waves comprising:

sinusoidal oscillator circuit means;

a frequency determining circuit coupled to said means and tuned to establish the oscillations therefrom at a frequency harmonically related to the center frequency of said carrier waves; and circuit means coupled to said oscillator circuit means for developing a wave including equal area pulses at a repetition rate related to the frequency of said oscillations, with said sinusoidal oscillator circuit means and with said last mentioned circuit means being incorporated in a monolithic semiconductor body.

5. An integrated circuit for translating angle modulated carrier waves comprising:

a monolithic semiconductor body processed to provide a plurality of resistive and capacitive elements and semiconductor devices connected to the circuit configuration described hereinafter and including a plurality of contact areas through which connections to said circuit configuration may be made;

said circuit configuration including an oscillator circuit having a signal feedback network to provide oscillations at a frequency harmonically related to the center frequency of said carrier waves and a monostable multivibrator circuit coupled to said oscillator circuit for developing pulse at a rate related to the frequency of the waves from said oscillator circuit;

one pair of said contact areas, comprising the wave input terminals for said integrated circuit, coupled to said oscillator circuit; and a second pair of contact areas, comprising the output terminals for said integrated circuit, coupled to said multivibrator circuit.

6. An integrated circuit as defined in claim 5 including a resonant circuit coupled to said feedback network and having an inductor separate from said integrated circuit, with said resonant circuit being coupled to said one pair of contact areas for providing carrier wave frequency selection and for determining the frequency of oscillation of said oscillator circuit.

7. An integrated circuit as defined in claim 5 including a resonant circuit coupled to said feedback network and having an inductor separate from said integrated circuit and coupled to a third pair of contact areas, said third pair of contact areas being coupled to said oscillator circuit to determine the frequency of oscillation thereof.

8. A signal translating system for angle modulated carrier waves comprising:

means providing an oscillator circuit having a free running oscillation frequency harmonically related to the center frequency of said carrier waves;

means for applying angle modulated carrier waves to said oscillator circuit;

means coupled to said oscillator circuit and responsive to the oscillations therefrom for providing a substantially constant amplitude wave having leading portions of substantially constant slope and a zero voltage axis crossing which is in fixed phase relation with respect to the zero voltage axis crossing of the oscillations from said oscillator circuit; and circuit means coupled to said last mentioned means and responsive to the leading portions of said wave for developing an output signal including equal area pulses at a repetition rate related to the frequency of the oscillations from said oscillator circuit.

9. A signal translating system for angle modulated carrier waves comprising:

an oscillator circuit including first and second transistors each having base, emitter and collector electrodes, a first resistor coupled between said emitter electrodes in common and a point of reference potential, a second resistor coupled between the collector electrode of said second transistor and a first point of operating potential and a regenerative feedback connection between the collector electrode of said second transistor and the base electrode of said first transistor;

means for applying angle modulated carrier waves to the base electrode of said first transistor;

a constant area pulse generator including third and fourth transistors each having base, emitter and collector electrodes, means coupling the base electrode of said third transistor to the collector electrode of said second transistor, means including a resistance-capacitance time constant network coupling the collector electrode of said third transistor to the base electrode of said fourth transistor, a third resistor coupled between the collector electrode of the fourth transistor and said first point of operating potential, a feedback circuit coupled between the collector electrode of said fourth transistor and the base electrode of said third transistor, means coupling the emitter electrodes of said third and fourth transistors to said point of reference potential, the values of the circuit components of said constant area pulse generator being such that said pulse generator operates as a monostable multivibrator with said third transistor conducting and said fourth transistor nonconducting for a period less than, but a substantial portion of, the period of a cycle of the wave from said oscillator circuit.

10. A signal translating system for angle modulated carrier waves comprising:

an oscillator circuit comprising first and second transistors each having base, emitter and collector electrodes, a first resistor coupled in common between said emitter electrodes and a point of reference potential, a second resistor coupled between the collector electrode of the second transistor and a point of operating potential, and a regenerative feedback connection between the collector electrode of said second transistor and the base electrode of said first transistor;

means for applying angle modulated carrier waves to the base electrode of said first transistor;

a limiter circuit comprising third and fourth transistors each having base, emitter and collector electrodes, a third resistor coupled in common between the emitter electrodes of said third and fourth transistors and said point of reference potential, a fourth resistor coupled between the collector electrode of said fourth transistor and said point of operating potential, and means coupling the base electrode of said third transistor to the collector electrode of said second transistor;

a monostable multivibrator comprising fifth and sixth transistors each including base, emitter and collector electrodes, means coupling the base electrode of said fifth transistor to the collector electrode of said fourth transistor, means including a resistance-capacitance time constant network coupling the collector electrode of said fifth transistor to the base electrode of said sixth transistor, a fifth resistor coupled to the collector electrode of said sixth transistor, a feedback circuit coupled between the collector electrode of said sixth transistor and the base electrode of said fifth transistor, means coupling the emitter electrodes of said fifth and sixth transistor to said point of reference potential, the circuit component values of said monostable multivibrator being such as to maintain the multivibrator in its unstable condition in response to waves from said limiter circuit for a period which is a substantial fraction of the period of the wave from said oscillator circuit.

11. An integrated circuit for translating angle modulated carrier waves comprising:

a monolithic semiconductor body processed to provide a plurality of resistive and capacitive elements and transistor devices connected in the circuit configuration described hereinafter and including a plurality of contact areas through which connections to said circuit configuration may be made;

said circuit configuration including:

an oscillator circuit having a pair of emitter coupled transistors regeneratively connected by a signal feedback network to provide stable Class A oscillation at a frequency harmonically related to the center frequency of said carrier waves, a limiter circuit coupled to said oscillator circuit and having a pair of emitter coupled transistors, a constant area pulse generator coupled to said limiter circuit and having a pair of transistors connected as a monostable multivibrator responsive to waves from said limiter circuit to switch from a stable circuit condition to an unstable circuit condition and back to the stable circuit condition within the period of a wave from said oscillator circuit, one pair of contact areas comprising the wave input terminals for said integrated circuit coupled to said oscillator circuit; and a second pair of contact areas comprising the output terminals from said integrated circuit coupled to said monostable multivibrator.

12. A signal translating system for angle modulated carrier waves comprising:

means providing a source of angle modulated carrier waves and including a resonant circuit tuned to the frequency of said carrier waves;

an amplifier having an output circuit and also having an input circuit coupled to said resonant circuit;

means providing an oscillator circuit having a free running oscillation frequency harmonically related to the center frequency of said carrier waves;

means for coupling said amplifier output circuit to said oscillator circuit;

means coupled to said oscillator circuit and responsive to the oscillations therefrom for providing a substantially constant amplitude wave having leading portions of substantially constant slope and a zero voltage axis crossing which is in fixed phase relation with respect to the zero voltage axis crossing of the oscillations from said oscillator circuit; and circuit means coupled to said last mentioned means and responsive to the leading portions of said wave for developing equal area pulses at a repetition rate related to the frequency of the oscillations from said oscillator circuit.

13. A signal translating system as defined in claim 12 wherein said oscillator circuit includes a second resonant circuit tuned to a frequency harmonically related to the frequency of said carrier waves for determining the frequency of oscillation of said oscillator circuit.

14. A signal translating system for angle modulated carrier waves comprising:

means providing a sinusoidal oscillator circuit having a free running frequency harmonically related to the center frequency of said carrier waves;

means for applying angle modulated carrier waves to said oscillator circuit;

circuit means coupled to said oscillator circuit for developing equal area pulses in response to the oscillations from said circuit, and at a repetition rate related to the frequency of said oscillations;

an amplifier circuit including a first transistor coupled to receive said equal area pulses and responsive to said pulses to be driven between cut-off and saturation, said amplifier circuit including a second transistor coupled to said first transistor for amplifying the pulses translated by said first transistor and for producing an output thereof; and integrating circuit means coupled to receive the amplified output pulses from said second transistor.

15. A signal translating system as defined in claim 14 wherein said oscillator circuit and said circuit means each include a plurality of resistors and an operating voltage supply and said second transistor includes a relatively high valued load resistor and a relatively high valued operating voltage supply as compared to the resistors and voltages used in said oscillator circuit and said circuit means.

16. A signal translating system as defined in claim 1 wherein said free running oscillation frequency and said repetition rate are at the same frequency of said carrier wave.

17. A signal translating system as defined in claim 1 wherein said free running oscillation frequency is the same as said carrier wave frequency and said repetition rate is a submultiple of said oscillation frequency.

18. A signal translating system as defined in claim 1 wherein said free running oscillation frequency and said repetition rate are both a submultiple of said carrier wave frequency.

19. A signal translating system as defined by claim 1 wherein said free running oscillation frequency is a submultiple of said carrier wave frequency and said repetition rate is a submultiple of said oscillation frequency.

20. A signal translating system for angle modulated carrier waves comprising:

an oscillator circuit including first means for establishing the free running oscillation frequency thereof at a rate harmonically related to the center frequency of said carrier waves, and for providing frequency selection of said waves;

second means for applying angle modulated carrier waves to said oscillator circuit; and third means coupled to said oscillator circuit for providing output signal indications corresponding to the modulating signal components of said angle modulated waves.

21. A signal translating system as defined in claim 20 wherein said first means includes a tuned resonant circuit coupled to the input circuit of said oscillator.

22. A signal translating system as defined in claim 20 wherein said third means includes means for developing a wave including equal area pulses at a repetition rate related to the frequency of the waves from said oscillator circuit.

23. A signal translating system for angle modulated carrier waves as defined in claim 20 wherein said oscillator circuit comprises a plurality of amplifier stages connected in cascade and a regenerative feedback path connecting the output terminal of the last of said cascade connected stages to the input terminal of the first of said cascaded stages to produce oscillations in said last cascaded stage.

24. A signal translating system for angle modulated carrier waves as defined in claim 23 wherein said first means includes a tuned resonant circuit coupled to the input circuit of the first of said cascaded stages.

25. A signal translating system for angle modulated carrier waves as defined in claim 23 wherein said regenerative feedback path includes a capacitive coupling means of sufficient value to cooperate with said plurality of cascaded amplifier stages and with the gain provided thereby to limit the positive and negative excursions of the oscillations produced in said last of said cascaded stages.

26. A signal translating system as defined in claim 25 wherein said first means includes a tuned resonant circuit coupled to the input circuit of the first of said cascaded stages and wherein said third means includes:

means coupled to said output terminal of said last of said cascaded stages for developing a wave train including constant area pulses at a repetition rate hormonically related to the frequency of the oscillations produced in said last stage; and means coupled to said developing means for averaging said wave train to derive the modulating signal components of said angle modulated carrier wave.

References Cited

UNITED STATES PATENTS

| | | | |
|---|---|---|---|
| 3,040,273 | 6/1962 | Boff | 307—88.5 |
| 3,141,135 | 7/1964 | Amlinger et al. | 307—88.5 |
| 3,182,265 | 5/1965 | Wu | 329—122 X |
| 3,260,948 | 7/1966 | Theriault | 330—38 |
| 2,899,643 | 8/1959 | Slonczewski | 329—122 X |

ALFRED L. BRODY, *Primary Examiner.*

UNITED STATES PATENT OFFICE

CERTIFICATE OF CORRECTION

Patent No. 3,399,353 August 27, 1968

Jack Avins

It is certified that error appears in the above identified patent and that said Letters Patent are hereby corrected as shown below:

Column 12, line 53, "to" should read -- in --; line 62, "pulse" should read -- pulses --.

Signed and sealed this 3rd day of March 1970.

(SEAL)
Attest:

Edward M. Fletcher, Jr.
Attesting Officer

WILLIAM E. SCHUYLER, JR.
Commissioner of Patents